United States Patent
Desroche

(10) Patent No.: US 8,991,747 B2
(45) Date of Patent: Mar. 31, 2015

(54) AIRCRAFT STABILIZATION SYSTEMS AND METHODS OF MODIFYING AN AIRCRAFT WITH THE SAME

(71) Applicant: BLR AeroSpace, L.L.C., Everett, WA (US)

(72) Inventor: Robert J. Desroche, Everett, WA (US)

(73) Assignee: BLR AeroSpace, L.L.C., Everett, WA (US)

( * ) Notice: Subject to any disclaimer, the term of this patent is extended or adjusted under 35 U.S.C. 154(b) by 25 days.

(21) Appl. No.: 13/871,710

(22) Filed: Apr. 26, 2013

(65) Prior Publication Data

US 2014/0166804 A1    Jun. 19, 2014

Related U.S. Application Data

(60) Provisional application No. 61/738,663, filed on Dec. 18, 2012.

(51) Int. Cl.
*B64C 27/82* (2006.01)
*B64C 27/12* (2006.01)
*B64C 27/04* (2006.01)

(52) U.S. Cl.
CPC ............... *B64C 27/12* (2013.01); *B64C 27/04* (2013.01)
USPC ........................................................ 244/17.19

(58) Field of Classification Search
USPC .......... 244/17.11, 17.19, 17.21, 87; 29/897.2, 29/402.3, 402.8
See application file for complete search history.

(56) References Cited

U.S. PATENT DOCUMENTS

| | | |
|---|---|---|
| 1,893,064 A | 1/1933 | Zaparka |
| 2,338,935 A | 1/1944 | Hafner |
| 2,626,766 A | 1/1953 | McDonald |
| 2,674,421 A | 4/1954 | De Cenzo |
| 2,862,361 A | 12/1958 | Koup |
| 2,959,373 A | 11/1960 | Zuck |
| 3,540,680 A | 11/1970 | Peterson |
| 3,807,662 A | 4/1974 | Velazquez |
| 3,966,145 A | 6/1976 | Wiesner |
| 4,200,252 A | 4/1980 | Logan et al. |
| 4,227,665 A | 10/1980 | Carlson et al. |
| D278,227 S | 4/1985 | Johnston, Jr. |
| 4,542,868 A | 9/1985 | Boyd |
| 4,708,305 A | 11/1987 | Kelley et al. |

(Continued)

FOREIGN PATENT DOCUMENTS

EP    0 615 903 B1    9/1999

OTHER PUBLICATIONS

AgustaWestland, A Finmeccanica Company, "AW 169", Brochure, Oct. 27, 2011, 2 pages.

(Continued)

*Primary Examiner* — Philip J Bonzell
(74) *Attorney, Agent, or Firm* — Seed IP Law Group PLLC

(57) ABSTRACT

A method of modifying a helicopter includes providing a tail boom of the helicopter and modifying a surface profile of the tail boom on at least a first side of the tail boom to improve flow attachment of air flowing over the first side of the modified tail boom during operation of the helicopter. The first side of the tail boom is located on an opposite side of the tail boom from a second side of the tail boom towards which a main rotor blade of the helicopter approaches during rotation.

41 Claims, 5 Drawing Sheets

(56) References Cited

U.S. PATENT DOCUMENTS

| | | | |
|---|---|---|---|
| 4,948,068 | A | 8/1990 | VanHorn |
| 5,209,430 | A | 5/1993 | Wilson et al. |
| 5,407,153 | A | 4/1995 | Kirk et al. |
| 5,492,448 | A | 2/1996 | Perry et al. |
| D425,853 | S | 5/2000 | Caporaletti |
| 6,352,220 | B1 | 3/2002 | Banks et al. |
| 6,869,045 | B1 | 3/2005 | Desroche |
| 7,063,289 | B2 | 6/2006 | Desroche |
| 7,338,011 | B2 | 3/2008 | Pauly |
| 8,074,926 | B2 | 12/2011 | Baker |
| 8,210,468 | B2 | 7/2012 | Desroche |
| 8,376,265 | B2 | 2/2013 | Desroche |
| 2003/0218102 | A1 | 11/2003 | Van Dam et al. |
| 2004/0155157 | A1 | 8/2004 | Bray |
| 2005/0116116 | A1 | 6/2005 | Morgenstern |
| 2008/0149762 | A1 | 6/2008 | Baker |
| 2009/0277991 | A1 | 11/2009 | Mikulla |
| 2009/0302167 | A1 | 12/2009 | Desroche |
| 2012/0091268 | A1 | 4/2012 | Baker |
| 2012/0256042 | A1 | 10/2012 | Altmikus et al. |
| 2012/0280079 | A1 | 11/2012 | Brand et al. |

OTHER PUBLICATIONS

Bell Helicopter, A Textron Company, "Bell 525 Relentless", Brochure, 2012, 4 pages.
Copy of PCT International Search Report and Written Opinion from counterpart PCT/US2008/006254, Mar. 3, 2009, 13 pages.
http://www.scalehelis.com/flyin/vert/vert.html, retrieved from http://www.web.archive.org on Sep. 11, 2008, 3 pgs.
http://www.scalehelis.com/flyin/vert/vert12.jpg, retrieved from http://www.web.archive.org on Sep. 11, 2008, 1 pg.
Kelley et al., "Two-Dimensional Aerodynamic Characteristics of Several Polygon-Shaped Cross-Sectional Models Applicable to Helicopter Fuselages", NASA Technical Paper 3233, AVSCOM Technical Report 92-B-002, Aug. 1992, 31 pages.
Lockwood et al., "Flight Characteristics Test of the UH-60A with Tail Boom Mounted Strake", US Army Aviation Systems Command, US Army Aviation Engineering Flight Activity, Edwards Air Force Base, California, USA AEFA Project No. 85-07, Oct. 1986, 31 pages.
Banks et al., National Aeronautics and Space Administration, NASA, "Exploratory Investigation of Aerodynamic Characteristics of Helicopter Tail Boom Cross-Section Models with Passive Venting", NASA/TP-2000-210083, Jun. 2000, 52 pages.
Wilson et al., "Aerodynamic Characteristics of Several Current Helicopter Tail Boom Cross Sections Including the Effect of Spoilers", NASA Technical Paper 2506, AVSCOM Technical Report 85-B-3, 1986, 73 pages.
Desroche, "Aircraft Stabilization Systems and Methods of Modifying an Aircraft With the Same," Restriction Requirement mailed Jul. 21, 2014, for U.S. Appl. No. 14/228,120, 8 pages.
Desroche, "Aircraft Stabilization Systems and Methods of Modifying an Aircraft With the Same," Response to Restriction Requirement filed Aug. 29, 2014, for U.S. Appl. No. 14/228,120, 6 pages.
Desroche, "Aircraft Stabilization Systems and Methods of Modifying an Aircraft With the Same," Restriction Requirement mailed Sep. 11, 2014, for U.S. Appl. No. 14/228,120, 6 pages.
International Search Report and Written Opinion, mailed Aug. 22, 2014, for corresponding International Application No. PCT/US2013/075783, 16 pages.
International Search Report and Written Opinion, mailed Aug. 22, 2014, for corresponding International Application No. PCT/US2014/035307, 15 pages.
International Search Report and Written Opinion, mailed Mar. 12, 2008, for PCT/US2007/018747, 14 pages.
Desroche, "Apparatus and Method for Use on Aircraft With Spanwise Flow Inhibitors" Office Action mailed Nov. 23, 2009, for U.S. Appl. No. 11/509,326, 7 pages.
Desroche, "Apparatus and Method for Use on Aircraft With Spanwise Flow Inhibitors" Amendment filed Apr. 22, 2010, for U.S. Appl. No. 11/509,326, 21 pages.
Desroche, "Apparatus and Method for Use on Aircraft With Spanwise Flow Inhibitors" Office Action mailed Jul. 6, 2010, for U.S. Appl. No. 11/509,326, 7 pages.
Desroche, "Aircraft Stabilizer System and Methods of Using the Same," Restriction Requirement mailed Feb. 22, 2011, for U.S. Appl. No. 12/152,661, 7 pages.
Desroche, "Aircraft Stabilizer System and Methods of Using the Same," Response to Restriction Requirement and Preliminary Amendment filed Mar. 22, 2011, for U.S. Appl. No. 12/152,661, 11 pages.
Desroche, "Aircraft Stabilizer System and Methods of Using the Same," Office Action mailed Jun. 7, 2011, for U.S. Appl. No. 12/152,661, 9 pages.
Desroche, "Aircraft Stabilizer System and Methods of Using the Same," Amendment filed Dec. 7, 2011, for U.S. Appl. No. 12/152,661, 12 pages.
Desroche, "Aircraft Stabilizer System and Methods of Using the Same," Supplemental Amendment filed Dec. 30, 2011, for U.S. Appl. No. 12/152,661, 7 pages.
Desroche, "Aircraft Stabilizer System and Methods of Using the Same," Notice of Allowance mailed Mar. 7, 2012, for U.S. Appl. No. 12/152,661, 7 pages.
Desroche, "Aircraft Stabilizer System and Methods of Using the Same," Amendment After Allowance filed May 10, 2012, for U.S. Appl. No. 12/152,661, 7 pages.
Desroche, "Aircraft Stabilizer System and Methods of Using the Same," Office Action mailed Aug. 15, 2012, for U.S. Appl. No. 13/485,623, 10 pages.
Desroche, "Aircraft Stabilizer System and Methods of Using the Same," Amendment filed Oct. 4, 2012, for U.S. Appl. No. 13/485,623, 12 pages.
Desroche, "Aircraft Stabilizer System and Methods of Using the Same," Notice of Allowance mailed Nov. 14, 2012, for U.S. Appl. No. 13/485,623, 8 pages.
Desroche, "Helicopter Tail Section and Retrofit Method," Notice of Allowance mailed Oct. 6, 2004, for U.S. Appl. No. 10/799,508, 10 pages.
Desroche, "Helecopter Tail Section," Office Action mailed Aug. 29, 2005, for U.S. Appl. No. 10/954,035, 10 pages.
Desroche, "Helecopter Tail Section," Amendment filed Jan. 23, 2006, for U.S. Appl. No. 10/954,035, 7 pages.
Desroche, "Helecopter Tail Section," Notice of Allowance mailed Apr. 13, 2006, for U.S. Appl. No. 10/954,035, 6 pages.

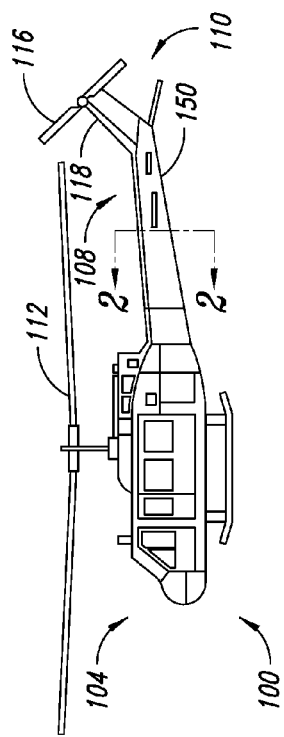
FIG. 1
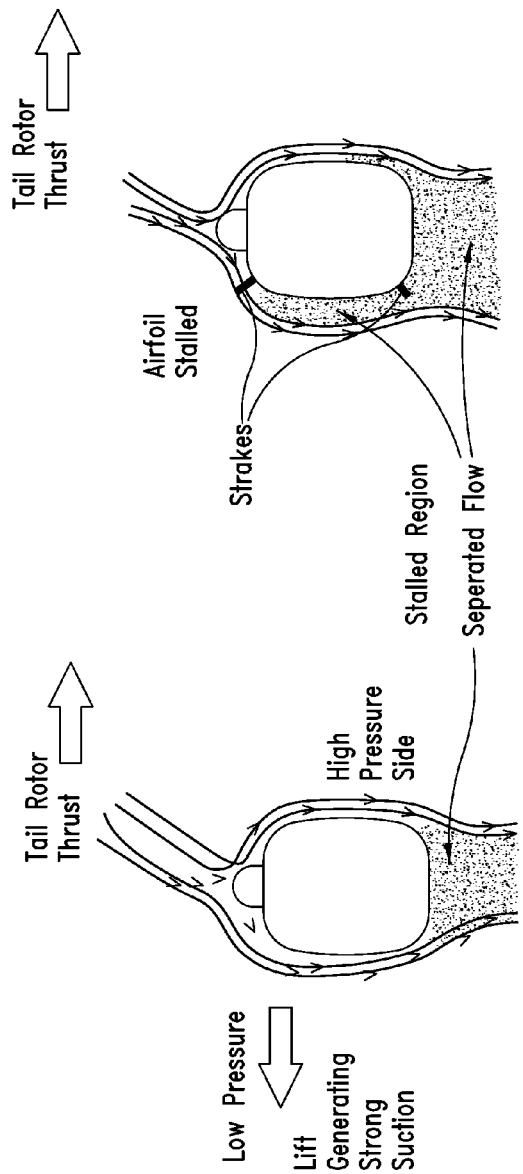
FIG. 2A
FIG. 2B

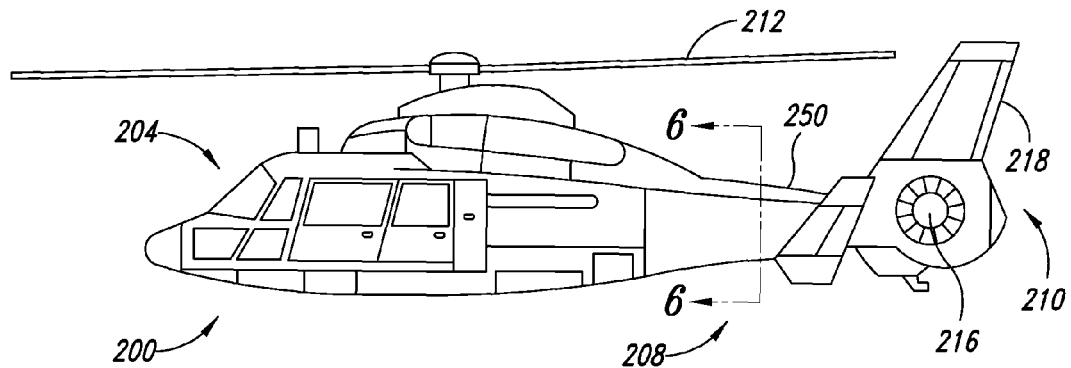
*FIG. 5*
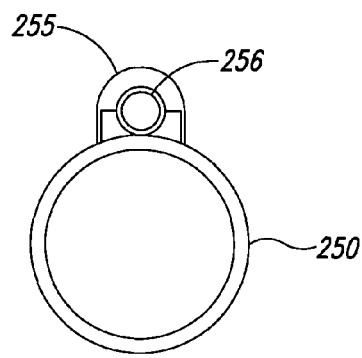
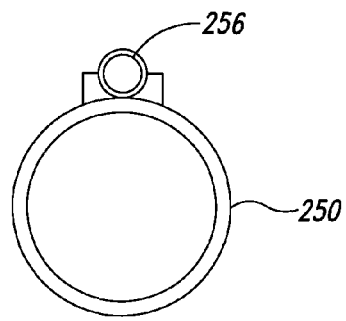
*FIG. 6A*  *FIG. 6B*
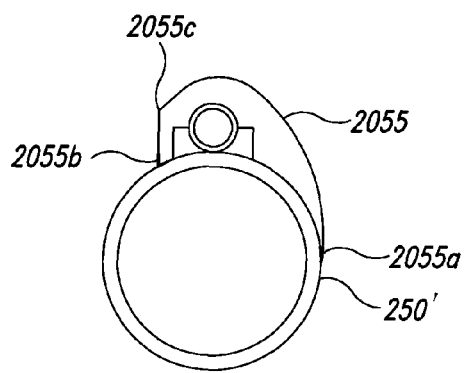
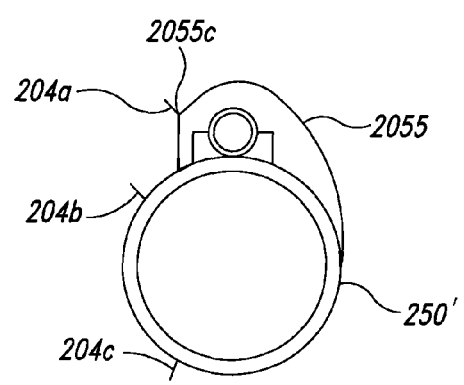
*FIG. 6C*  *FIG. 6D*

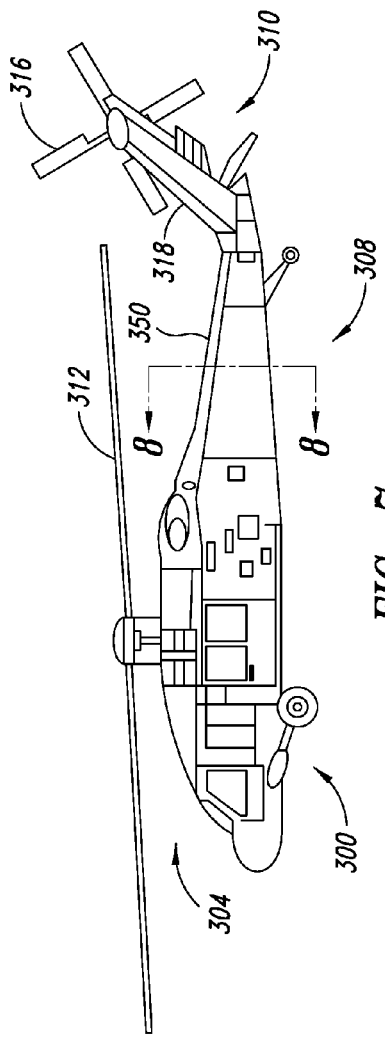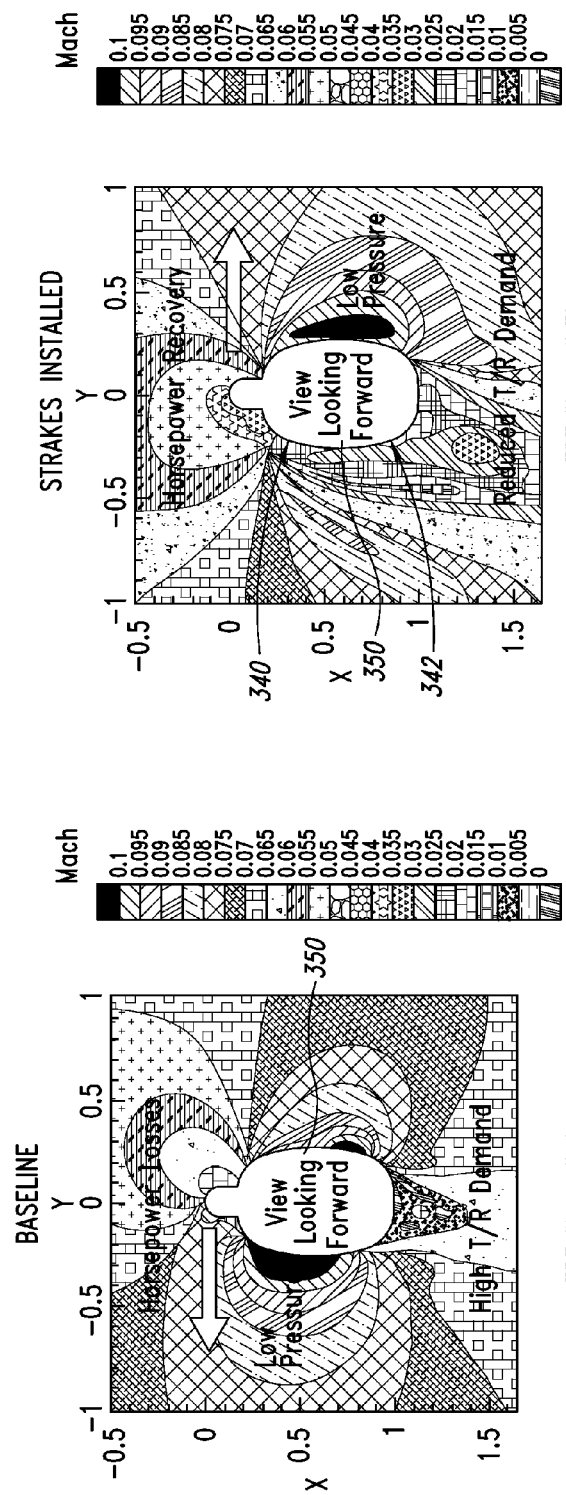

AIRCRAFT STABILIZATION SYSTEMS AND METHODS OF MODIFYING AN AIRCRAFT WITH THE SAME

BACKGROUND

1. Technical Field

The present disclosure generally relates to stabilization systems and methods of modifying aircraft with the stabilization systems, and more specifically to modifying the tail booms of helicopters with stabilization systems that alter the aerodynamics of the helicopter.

2. Description of the Related Art

Traditional single rotor helicopters have a main lifting rotor ("main rotor") that provides a lifting force and a tail rotor that provides a laterally directed force used to counter reaction torque of the main rotor and adjust yaw alignment. As the main rotor passes over the tail boom of the helicopter, the main rotor generates downwash that flows around the tail boom of the helicopter. It is known to include strakes on the approaching side of the tail boom to alter the flow of downwash from the rotating main rotor so as to generate a compensation force that at least partially counteracts the reaction torque produced by rotation of the main rotor. The "approaching side" of the tail boom is the side of the tail boom the main rotor blade approaches during rotation.

For example, U.S. Pat. No. 4,708,305 describes a system for controlling main rotor torque which reduces the power and size requirements of conventional anti-torque means (such as a tail rotor). Torque countering forces are generated by disrupting the main rotor downwash flowing around the fuselage. In particular, the downward flow is separated from the fuselage surface by strakes positioned at specified locations on the approaching side of the tail boom.

U.S. Pat. No. 8,210,468 describes a stabilizer system for a helicopter that includes strakes installed on the approaching side of the tail boom and a modified vertical stabilizer. The components of the stabilizer system cooperate to improve handling of the helicopter (e.g., increased cross wind tolerance), reduce fatigue (e.g., tail boom fatigue, fuselage fatigue, and the like), improve climb performance, improve cruise performance, increase control safety margins, combinations thereof, and the like.

BRIEF SUMMARY

In each of the systems noted above, strakes are installed on an approaching side of the tail boom to promote air flow separation. However, none of the systems discussed above include alterations to the side of the tail boom opposite to the approaching side to further improve flow characteristics of downwash from the rotating main lifting rotor.

It has been recognized that altering the profile of the tail boom of a helicopter to make the opposite side of the tail boom more aerodynamic in a way that promotes flow attachment on the opposite side of the tail boom can improve the stability of the helicopter. At least some embodiments disclosed herein relate to a method of modifying a helicopter that includes providing a tail boom of the helicopter and modifying a surface profile of the tail boom on at least a first side of the tail boom to improve flow attachment of air flowing over the first side of the modified tail boom during operation of the helicopter. The first side of the tail boom is located on an opposite side of the tail boom from a second side of the tail boom. The main rotor blade of the helicopter approaches the second side of the tail boom during rotation.

The first and the second sides of the tail boom can have substantially symmetrical surface profiles about a vertical plane of the tail boom prior to the modifying the surface profile of the tail boom, and modifying the surface profile of the tail boom includes altering the surface profile such that the first side and the second side of the modified tail boom have asymmetrical surface profiles about the vertical plane of the tail boom. Altering the surface profile can include reducing the size of a shoulder portion on the first side of the tail boom. In other embodiments, altering the surface profile can include eliminating a shoulder portion on the first side of the tail boom.

Modifying the surface profile of the tail boom can include replacing a tail rotor drive shaft cover of the tail boom. In other embodiments, modifying the surface profile of the tail boom includes adding a structural element to the first side of the tail boom. Modifying the surface profile of the tail boom can include increasing a cross-sectional area of the tail boom on the first side of the tail boom such that the modified tail boom includes an asymmetrical cross-sectional area about a vertical plane of the modified tail boom. In other aspects, modifying the surface profile of the tail boom can include reshaping the surface profile of the tail boom to include a single, continuous curve that extends from a vertical apex of the modified tail boom to a horizontal apex on the first side of the modified tail boom of the modified tail boom. Modifying the surface profile of the tail boom can include replacing a tail rotor drive shaft cover of the tail boom. In other embodiments, modifying the surface profile of the tail boom can include adding a structural element to the first side of the tail boom.

Modifying the surface profile of the tail boom can include modifying the surface profile on the second side of the tail boom to promote flow separation at a fixed separation point on the second side of the tail boom during operation of the helicopter. Modifying the surface profile of the tail boom can include coupling at least one strake on the second side of the tail boom that promotes flow separation at the fixed separation point on the second side of the tail boom during operation of the helicopter. Modifying the surface profile of the tail boom can include reshaping the surface profile of the tail boom to include a second portion that extends in a single, continuous curve from the vertical apex of the modified tail boom to a shelf that extends substantially vertically on the second side of the modified tail boom. The method can further include coupling a first strake to the second side of the tail boom at a transition point between the single, continuous curve and the shelf. The method can further include coupling a second strake to the second side of the tail boom at a position vertically below the first strake. The transition point can be located above a vertical center of the modified tail boom.

In some embodiments, a method of modifying a tail boom of a helicopter is provided. The tail boom includes an approaching boom side and exiting boom side that respectively extend vertically on opposite sides of a vertical plane of the tail boom. The helicopter includes a main rotor arranged to pass over the approaching boom side of the tail boom before passing over the exiting boom side of the tail boom in each of a plurality of rotations of the main rotor. The method includes providing the tail boom of the helicopter. The approaching boom side and the exiting boom side of the tail boom have substantially symmetrical surface profiles about the vertical plane of the tail boom. The method further includes modifying at least the exiting surface profile of the tail boom so that an exiting surface profile of the modified tail boom is not symmetrical to an approaching surface profile of the modified tail boom.

Modifying the tail boom can include removing a first rotor drive shaft cover installed on the tail boom, in which the first rotor drive shaft cover includes a first profile; and coupling a second rotor drive shaft cover to the tail boom, in which the second rotor drive shaft includes a second profile that is more aerodynamic than the first profile. Modifying the tail boom can include adding a structural member to the tail boom on at least the exiting boom side of the tail boom.

In another aspect, the method of modifying the tail boom can include providing at least one strake on the approaching side of the tail boom.

A method of modifying a tail boom of a helicopter may be summarized as including removing a first rotor drive shaft cover from the tail boom, in which the first rotor drive shaft cover including a first external surface that is substantially symmetrical about a vertical plane of the tail boom when installed on the tail boom; and installing a second rotor drive shaft cover on the tail boom, in which the second drive shaft cover including a second external surface that is asymmetrical about the vertical plane of the tail boom when installed on the tail boom.

The second external surface can be shaped to promote flow attachment on a first side of the tail boom when the modified tail boom is subjected to a downdraft from rotation of a main rotor of the helicopter. The first side of the tail boom is opposite to a second side of the tail boom towards which the main rotor approaches the tail boom during rotation. The second external surface can be shaped to promote flow separation at a fixed separation point on the second side of the modified tail boom when the modified tail boom is subjected to the downdraft from rotation of the main rotor of the helicopter. The second rotor drive shaft cover can include at least one strake positioned and shaped to promote flow separation at the fixed separation point on the second side of the modified tail boom when the modified tail boom is subjected to the downdraft from rotation of the main rotor of the helicopter. The method can further include coupling at least one strake to the second side of the tail boom in a location that will promote flow separation at a fixed separation point on the second side of the tail boom when the modified tail boom is subjected to the downdraft from rotation of the main rotor of the helicopter.

The second external surface can include a first portion that extends in a single, continuous curve from a vertical apex of the second rotor drive shaft cover to a horizontal apex on the first side of the tail boom. The second external surface can include a second portion that extends in a single, continuous curve from the vertical apex of the second rotor drive shaft cover to a shelf that extends substantially vertically on the second side of the modified tail boom. The method can further include coupling a first strake to the second side of the tail boom at a transition point between the single, continuous curve on the second external surface and the shelf. The method can further include coupling a second strake to the second side of the modified tail boom at a position vertically below the first strake. The transition point can be located above a vertical center of the modified tail boom.

The first external surface can include shoulder portions that are symmetrical about the vertical plane, and the second external surface includes asymmetrical shoulder portions about the vertical plane. In another aspect, the first external surface includes shoulder portions that are symmetrical about the vertical plane, and the second external surface does not include any shoulder on at least one side of the modified tail boom. The second external surface may not include any shoulder on a first side of the tail boom that is opposite to a second side of the tail boom towards which a main rotor blade of the helicopter approaches during rotation. The second external surface can include an airfoil shape that promotes a lower air pressure on the first side of the modified tail boom when subjected to the downdraft from the main rotor.

In some embodiments, a method of modifying a tail boom of a helicopter includes coupling an airflow modification element to an external surface of a fuselage of the tail boom to modify an external profile of the tail boom on at least a first side of the tail boom and thereby promote a continuous flow pattern on the first side of the modified tail boom when the modified tail boom is subjected to a downdraft from a main rotor of the helicopter. The first side of the tail boom is opposite to a second side of the tail boom towards which the main rotor approaches the tail boom during rotation.

The modified external profile can include a first portion that extends in a single, continuous curve from a vertical apex of the modified tail boom to a horizontal apex on a first side of the modified tail boom. Coupling the airflow modification element to the external surface of the fuselage of the tail boom can modify the external profile of the tail boom on the second side of the tail boom such that the modified tail boom includes a single, continuous curve from the vertical apex of the modified tail boom to a shelf that extends substantially vertically on the second side of the modified tail boom. The method can further include coupling a first strake to the second side of the tail boom at a transition point between the single, continuous curve on the second external surface and the shelf. The method can also include coupling a second strake to the second side of the tail modified boom at a position vertically below the first strake. The transition point can be located above a vertical center of the modified tail boom.

BRIEF DESCRIPTION OF THE SEVERAL VIEWS OF THE DRAWINGS

In the drawings, identical reference numbers identify similar elements or acts.

FIG. 1 is a side elevation view of a helicopter prior to modification.

FIG. 2A is a cross-sectional view of the tail boom of the helicopter of FIG. 1 that illustrates airflow around the tail boom of the helicopter due to downdrafts from the main rotor.

FIG. 2B is a cross-sectional view of the tail boom of the helicopter of FIG. 1 modified to include strakes on the tail boom that illustrates airflow around the tail boom of the helicopter due to downdrafts from the main rotor.

FIG. 5 is a side elevation view of another helicopter prior to modification.

FIG. 6A is a cross-sectional view of a tail boom, looking forward from the tail, prior to modification.

FIG. 6B is a cross-sectional view of the tail boom of FIG. 6A with the drive shaft cover removed.

FIG. 6C is a cross-sectional view of the tail boom of FIG. 6B with a more aerodynamic drive shaft cover installed.

FIG. 6D is a cross-sectional view of the tail boom of FIG. 6C with strakes installed on the tail boom.

FIG. 7 is a side elevation view of another helicopter prior to modification.

FIG. 8A is a cross-sectional view of the tail boom of the helicopter of FIG. 7 that illustrates airspeeds of air flowing around the tail boom of the helicopter due to downdrafts from the main rotor.

FIG. 8B is a cross-sectional view of the tail boom of the helicopter of FIG. 7 modified to include strakes on the tail boom that illustrates airspeeds of air flowing around the tail boom of the helicopter due to downdrafts from the main rotor.

DETAILED DESCRIPTION

Figure 4A:
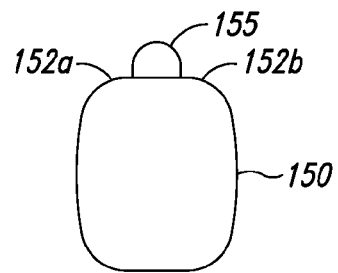
FIG. 4A is a cross-sectional view of a tail boom, looking forward from the tail, prior to modification.

In the following description, certain specific details are set forth in order to provide a thorough understanding of various embodiments of the invention. However, one skilled in the art will understand that the invention may be practiced without these details. Tail boom modification systems are disclosed in the context of tail sections of helicopters because they have particular utility in this context. However, these modifications can be incorporated into other types of aircraft in which aerodynamics is a significant consideration. Terms, such as "rear," "front," "rearward," "forward," "counter clockwise," "clockwise," "upward," and "downward," and variations thereof are used to describe the illustrated embodiments and are used consistently with the description of non-limiting exemplary applications. It will be appreciated, however, that the illustrated embodiments can be located or oriented in a variety of desired positions.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The Abstract of the Disclosure provided herein is for convenience only and does not interpret the scope or meaning of the embodiments.

FIG. 1 shows a helicopter 100 including a cabin fuselage section 104 and a tail section 108 connected to and extending outwardly from the cabin fuselage section 104. A vertical stabilizer 118 is fixedly coupled to a free end 110 of the tail section 108. A tail rotor 116 is rotatably coupled to the vertical stabilizer 118. A main rotor 112 provides a lifting force.

FIG. 2A is a cross-sectional view of the tail boom 150 of the helicopter 100 of FIG. 1, taken looking forward from the tail 118 of the helicopter 100. The tail boom 150 includes a tail rotor drive shaft cover 155 that covers the drive shaft for the tail rotor 116. The tail boom 150 includes distinct shoulder portions 152a and 152b on either side of the tail rotor drive shaft cover 155. Several structural elements are left out of the representation in FIG. 2A for ease of representation. For example, the tail rotor drive shaft is not illustrated in FIG. 2A.

FIG. 2A illustrates airflow around the tail boom 150 of the helicopter 100 due to downwash from the main rotor 112. In this example, the main rotor 112 has a counter-clockwise rotation that sends the downwash over the tail boom 150 at an approximately 7-10° angle of attack. The shape of the profile of the tail boom 150 combined with the angle of attack of the downwash creates a low pressure zone on the side of the tail boom the main rotor approaches during rotation ("the approaching side" of the tail boom) and a high pressure zone on the opposite side of the tail boom. As illustrated in FIG. 2A, this pressure differential generates a surge in lift force that opposes the tail rotor thrust with the passage of each blade of the main rotor 112.

As noted above, it is known to include strakes on the approaching side of the tail boom to alter the flow of downwash from the rotating main rotor so as to generate a compensation force. For example, as shown in FIG. 2B, strakes 140 and 142 are installed on the approaching side of the tail boom to promote a flow separation. By fixing the flow separation points with the strakes 140 and 142, a region of stalled flow with a relatively high pressure is created, which can improve the stability of the tail boom 150 during, for example, takeoff and hovering operations.

It has been further recognized that altering the profile of the tail boom of a helicopter to make the opposite side of the tail boom (the side opposite the approaching side) more aerodynamic in a way that promotes flow attachment on the opposite side of the tail boom has many benefits. For example, altering the profile of the opposite side of the tail boom can, among other benefits: (i) remove downforce penalties resulting from a disadvantageously shape tail boom profile; (ii) result in horsepower savings by at least partially counteracting the reaction torque produced by rotation of the main rotor; and (iii) and can improve directional control by promoting a reduction in what is known as "loss of tail rotor effect" (in helicopters that include a main rotor that rotates counter-clockwise) or "uncommanded left yaw" (in helicopters that include a main rotor that rotates clockwise).

In one embodiment, the profile of the tail boom is altered to slow flow on the approaching side of the tail boom and speed up air flow on the opposite side of the tail boom. The alteration can be achieved by removing an existing tail rotor drive shaft cover from the tail boom and replacing it with a tail rotor drive shaft cover that has a more aerodynamic profile. The alteration can also be achieved by adding structure to the tail boom. The resulting tail boom can have a profile that resembles an airfoil (e.g. having a continuous cambered surface). The alteration may, or may not include the addition of strakes to the approaching side of the tail boom. Although the examples discussed below relate to modifications of tail booms that include a separate tail rotor drive shaft cover, the principles of the present disclosure are also applicable to modifications of tail booms in which the tail rotor drive shaft is housed entirely within the fuselage of the tail boom. In such cases, the modification may include, for example, the addition of at least one structural element to at least the opposite side of the tail boom to improve the aerodynamic profile of the tail boom.

As shown in FIG. 2B, airflow over the opposite side of the tail boom 150 takes a sharp turn at the shoulder 152b, which is adjacent the tail rotor drive shaft cover 155. This sharp turn not only detrimentally slows the speed of flow passing on the opposite side of the tail boom 150, but also results in a downforce that counteracts the lift generated main rotor 112.

Figure 3:
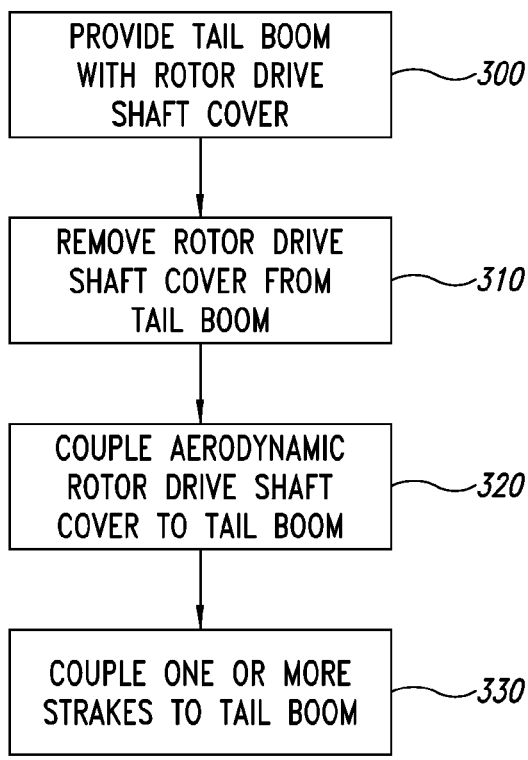
FIG. 3 is a flow chart of a method for modifying a tail boom according to one embodiment.
Figure 4B:
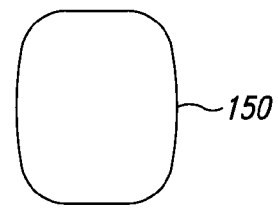
FIG. 4B is a cross-sectional view of the tail boom of FIG. 4A with the drive shaft cover removed.
Figure 4C:
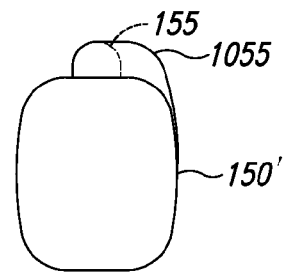
FIG. 4C is a cross-sectional view of the tail boom of FIG. 4B with a more aerodynamic drive shaft cover installed.
Figure 4D:
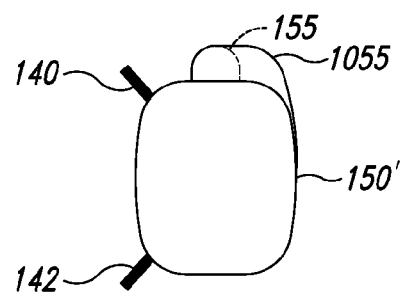
FIG. 4D is a cross-sectional view of the tail boom of FIG. 4C with strakes installed on the tail boom.

FIG. 3 is a flow chart of a method for modifying a tail boom to according to one embodiment. FIGS. 4A-4D are cross-sectional views of a tail boom undergoing the modification described in FIG. 3. At 300, a tail boom that includes a rotor shaft cover is provided. For example, the tail boom 150, which includes the rotor shaft cover 155 is provided. At 310, the tail rotor drive shaft cover is removed from the tail boom. At 320, an aerodynamic tail rotor drive shaft cover is coupled to the tail boom. For example, FIG. 4C illustrates an aerodynamic tail rotor drive shaft cover 1055 coupled to the tail boom resulting in a modified tail boom 150'. The outline of prior location of the rotor shaft cover 155 is shown in broken lines. As can be seen in FIG. 4C, the aerodynamic tail rotor drive shaft cover 1055 eliminates the shoulder 152b on the opposite side of the tail boom. At 330, one or more strakes are coupled to the approaching side of the tail boom. For example, FIG. 4D illustrates strakes 140 and 142 coupled to the approaching side of the modified tail boom 150'.

Thus, the tail boom 150 is modified from having symmetrical shoulders 152a and 152b on either side of a vertical plane of the tail boom, to eliminating the shoulder 152b on the opposite side of the tail boom. The tail boom 150 also has a substantially symmetrical profile about the vertical plane of the tail boom, whereas the modified tail boom 150' has an asymmetrical profile. The profile of the modified tail boom 150' includes a continuous surface from a vertical apex of the aerodynamic drive shaft cover 1055 to a horizontal apex on the opposite side of the modified tail boom 150'. As a result, the profile on the opposite side of the modified tail boom 150' promotes flow attachment from main rotor downwash.

The strakes on the approaching side of the tail boom promote flow separation at fixed separation points. Although this embodiment illustrates one or more strakes coupled to the tail boom following modification, the strakes can be attached prior to modification. Further, the aerodynamic drive shaft cover may include structure that function as a strake. In other examples, no strakes are added to the approaching side of the tail boom. In addition, the flow separation on the approaching side can be achieved by strakes, shape modification of the tail boom, or a combination of both.

Unlike the tail boom 150 in FIG. 2A, the modified tail boom 150' of FIG. 4D has a high pressure zone on the approaching side of the tail boom and a low pressure zone on the opposite side of the tail boom. This improved pressure distribution results in horsepower savings by at least partially counteracting the reaction torque produced by rotation of the main rotor. It also improves directional control by reducing loss of tail rotor effect.

FIG. 5 shows a helicopter 200 including a cabin fuselage section 204 and a tail section 208 connected to and extending outwardly from the cabin fuselage section 204. A vertical stabilizer 218 is fixedly coupled to a free end 210 of the tail section 208. A tail rotor 216 is rotatably coupled to the vertical stabilizer 218. A main rotor 212 provides a lifting force.

FIGS. 6A-6D are cross-sectional views of a tail boom undergoing a modification according to another embodiment. FIG. 6A shows a tail boom 250, which includes a tail rotor drive shaft cover 255 covering the rotor drive shaft 256. The tail rotor shaft cover 255 has a profile that is substantially symmetrical about a vertical plane that passes through a vertical apex of the cover 255. FIG. 6B shows the tail boom 250 with the tail rotor drive shaft cover 255 removed. FIG. 6C illustrates an aerodynamic tail rotor drive shaft cover 2055 coupled to the tail boom resulting in a modified tail boom 250'. Unlike the cover 255, the cover 2055 is asymmetrical about a vertical plane that passes through a vertical apex of the cover 2055. The cover 2055 can include a hinge at point 2055c and be coupled to the tail boom 250 at points 2055a and 2055b. FIG. 6D illustrates strakes 204b and 204c coupled to the approaching side of the modified tail boom 250'. A strake 204a may also optionally be coupled to the approaching side of the tail rotor drive shaft cover 2055.

As can be seen in FIGS. 6C and 6D, the aerodynamic tail rotor drive shaft cover 2055 defines a continuous curve between a vertical apex of the cover 2055 and a horizontal apex on the opposite side of the modified tail boom 250'. The cover 2055 defines a shelf on the approaching side of the tail boom 250'. The resulting asymmetrical profile promotes flow attachment on the opposite side and flow separation on the approaching side. In this example, the strake 204a is positioned at a transition point 2055c between a continuous curve and a vertical surface of the shelf on the approaching side. The strake 204a generates a fixed point of flow separation on the approaching side.

The modified tail boom 250' in FIG. 6D generates a more favorable pressure distribution than the tail boom 250 in FIG. 6A. For example, the continuous curve on the opposite side of the modified tail boom 250' and the shelf and strakes on the approaching side of the modified tail boom 250' create a lift force in the same direction as the tail rotor force.

FIG. 7 shows a helicopter 300 including a cabin fuselage section 304 and a tail section 308 connected to and extending rearwardly from the cabin fuselage section 304. A vertical stabilizer 318 is fixedly coupled to a free end 310 of the tail section 308. A tail rotor 316 is rotatably coupled to the vertical stabilizer 318. A main rotor 312 provides a lifting force.

Figure 11:
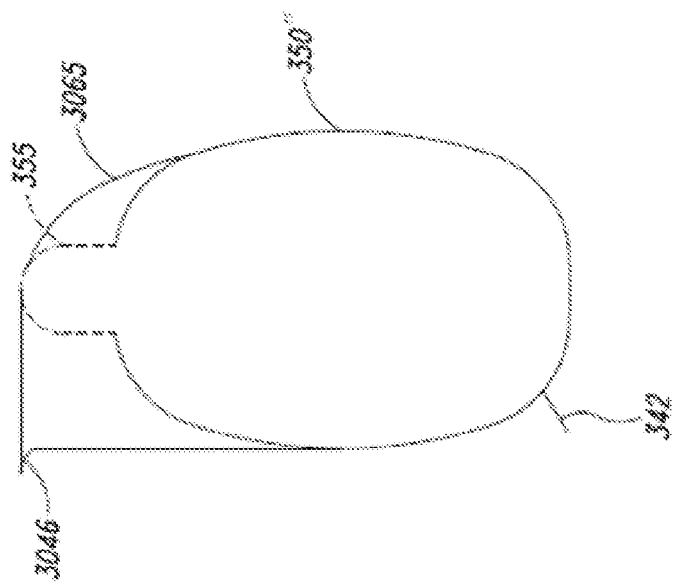
FIG. 11 is a cross-sectional view of a modified tail boom according to another embodiment.
Figure 10:
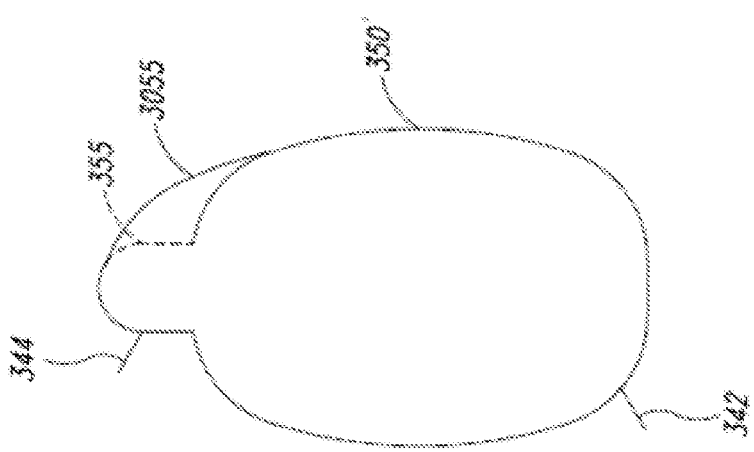
FIG. 10 is a cross-sectional view of a modified tail boom according to one embodiment.
Figure 9:
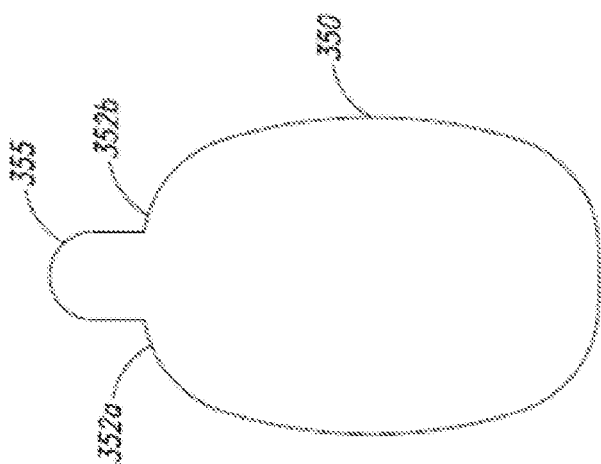
FIG. 9 is a cross-sectional view of the tail boom of the helicopter of FIG. 7, looking forward from the tail, prior to modification.

FIGS. 8A and 8B illustrate the beneficial flow distribution that can be achieved by adding strakes to the approaching side of the tail boom 350. FIG. 9 illustrates a cross-sectional view of the tail boom 350 prior to modification, and FIGS. 10 and 11 illustrate two different tail boom modifications according to the present disclosure. In FIG. 10, the tail boom cover 355 is replaced with an aerodynamic tail boom cover 3055 that eliminates the shoulder 352b on the opposite side of the tail boom 350. The modified tail boom 350' in FIG. 10 also includes strakes 344 and 342 on the approaching side of the tail boom.

The modified tail boom 350" in FIG. 11 includes an aerodynamic drive shaft cover 3065 that eliminates both of the shoulders 352a and 352b. The approaching side of the cover 3065 includes a structure 3046 that functions as a strake to separate flow at a fixed location. A strake 342 is also affixed to the approaching side of the modified tail boom 350".

As with the previous examples, the modified tail booms 350' and 350" provide for a more advantageous flow pattern around the tail boom than the symmetrical profile of the tail boom prior to modification.

The tail boom modifications disclosed herein can be incorporated into a wide range of helicopters. As used herein, the term "helicopter" includes, without limitation, rotorcraft aircraft, rotary-wing aircraft, or other heavier-than-air aircraft that are lifted and sustained in the air horizontally by rotating wings or blades turning about a vertical axes using power supplied by an engine. For example, helicopters including the Bell UH-1, Bell Huey II, Sikorsky UH-60, and Eurocopter HH-65A Dolphin helicopters are well suited for retrofitting with the tail boom systems disclosed herein. The various embodiments described above can be combined to provide further embodiments.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. The embodiments, features, systems, devices, materials, methods and techniques described herein may, in some embodiments, be similar to any one or more of the embodiments, features (e.g., strakes), systems, devices, materials, methods and techniques described in U.S. Provisional Patent Application No. 60/930,233 and U.S. Pat. Nos. 4,708,305; 6,869,045; and 7,063,289. In addition, the embodiments, features, systems, devices, materials, methods and techniques described herein may, in certain embodiments, be applied to or used in connection with any one or more of the embodiments, features, systems, devices, materials, methods and techniques disclosed in the above-mentioned U.S. Provisional Patent Application No. 60/930,233 and U.S. Pat. Nos. 4,708,305; 6,869,045; 7,063,289; and 8,210,468. The above-mentioned U.S. Provisional Patent Application No. 60/930,233 and U.S. Pat. Nos. 4,708,305; 6,869,045; 7,063,289; and 8,210,468 are hereby incorporated by reference herein. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to modify a helicopter, comprising:
   removing a first tail rotor drive shaft cover that covers a tail rotor drive shaft that is mounted exterior to a tail boom of the helicopter; and
   physically coupling a replacement tail rotor drive shaft cover to a first exterior surface of the tail boom of the helicopter to cover the tail rotor drive shaft, the replacement tail rotor drive shaft cover having an approaching side that includes at least a portion that is not curved and extends directly in a vertical direction, an exiting side opposite the approaching side, and a vertical apex at an intersection between the approaching side and the exiting side, the approaching side, the exiting side, and the vertical apex which collectively form at least a portion of a second exterior surface of the replacement tail rotor drive shaft cover that causes acceleration of air flow along the exiting side and does not cause acceleration of air flow along the approaching side, the second exterior surface asymmetrical with respect to a vertical plane that passes through the vertical apex.

2. The method of claim 1 wherein physically coupling the replacement tail rotor drive shaft cover to the first exterior surface of the tail boom of the helicopter to cover the tail rotor drive shaft comprises physically coupling the replacement tail rotor drive shaft cover to the first exterior surface of the tail boom of the helicopter to form a cavity to house the tail rotor drive shaft between the tail boom of the helicopter and the replacement tail rotor drive shaft cover.

3. The method of claim 1 wherein physically coupling the replacement tail rotor drive shaft cover to the first exterior surface of the tail boom of the helicopter to cover the tail rotor drive shaft comprises physically coupling the replacement tail rotor drive shaft cover to the first exterior surface of the tail boom of the helicopter to cover the tail rotor drive shaft, the replacement tail rotor drive shaft cover having the approaching side that includes at least the portion that is not curved, the exiting side that is opposite the approaching side and extends curvedly downwards from the vertical apex, and the vertical apex at the intersection between the approaching side and the exiting side.

4. The method of claim 1 wherein physically coupling the replacement tail rotor drive shaft cover to the first exterior surface of the tail boom of the helicopter to cover the tail rotor drive shaft comprises physically coupling the replacement tail rotor drive shaft cover to the first exterior surface of the tail boom of the helicopter to cover the tail rotor drive shaft, the replacement tail rotor drive shaft cover having the approaching side that includes at least the portion that is not curved and that extends directly in the vertical direction, the exiting side that is opposite the approaching side and extends curvedly downwards from the vertical apex, and the vertical apex at the intersection between the approaching side and the exiting side.

5. The method of claim 1 wherein physically coupling the replacement tail rotor drive shaft cover to the first exterior surface of the tail boom of the helicopter to cover the tail rotor drive shaft comprises physically coupling the replacement tail rotor drive shaft cover to the first exterior surface of the tail boom of the helicopter to cover the tail rotor drive shaft, the replacement tail rotor drive shaft cover having the approaching side that includes at least the portion that is not curved, the exiting side that is opposite the approaching side and extends downwards from the vertical apex to form a single continuous curve from the vertical apex to a first end, and the vertical apex at the intersection between the approaching side and the exiting side.

6. The method of claim 1 wherein physically coupling the replacement tail rotor drive shaft cover to the first exterior surface of the tail boom of the helicopter to cover the tail rotor drive shaft comprises physically coupling the replacement tail rotor drive shaft cover to the first exterior surface of the tail boom of the helicopter to cover the tail rotor drive shaft, the replacement tail rotor drive shaft cover having the approaching side, the exiting side, and the vertical apex which collectively form a cambered housing that covers the tail rotor drive shaft.

7. The method of claim 6 wherein physically coupling the replacement tail rotor drive shaft cover to the first exterior surface of the tail boom of the helicopter to cover the tail rotor drive shaft comprises physically coupling the replacement tail rotor drive shaft cover to the first exterior surface of the tail boom of the helicopter to cover the tail rotor drive shaft, the replacement tail rotor drive shaft cover having an interior space opposite the second exterior surface and sized to house the tail rotor drive shaft.

8. The method of claim 1 wherein physically coupling the replacement tail rotor drive shaft cover to the first exterior surface of the tail boom of the helicopter to cover the tail rotor drive shaft comprises physically coupling the replacement tail rotor drive shaft cover to the first exterior surface of the tail boom of the helicopter to cover the tail rotor drive shaft, the replacement tail rotor drive shaft cover having the approaching side that includes a first portion that extends curvedly downwards from a vertical apex to a transition point and a second portion that extends vertically downwards from the transition point to a first end, the exiting side opposite the approaching side, and the vertical apex at the intersection between the approaching side and the exiting side.

9. The method of claim 8 wherein physically coupling the replacement tail rotor drive shaft cover to the first exterior surface of the tail boom of the helicopter to cover the tail rotor drive shaft comprises physically coupling at least the first end of the replacement tail rotor drive shaft cover to the first exterior surface of the tail boom of the helicopter to cover the tail rotor drive shaft, the replacement tail rotor drive shaft cover having the approaching side that includes the first portion that extends curvedly downwards from the vertical apex to the transition point and the second portion that extends vertically downwards from the transition point to the first end, the exiting side opposite the approaching side, the vertical apex at the intersection between the approaching side and the exiting side, and a hinge at the transition point.

10. The method of claim 8 wherein physically coupling the replacement tail rotor drive shaft cover to the first exterior surface of the tail boom of the helicopter to cover the tail rotor drive shaft comprises physically coupling at least the first end of the replacement tail rotor drive shaft cover to the first exterior surface of the tail boom of the helicopter to cover the tail rotor drive shaft, the replacement tail rotor drive shaft cover having the approaching side that includes the first portion that extends curvedly downwards from the vertical apex to the transition point and the second portion that extends vertically downwards from the transition point to the first end, the exiting side opposite the approaching side, the vertical apex at the intersection between the approaching side and the exiting side, and a strake at the transition point.

11. The method of claim wherein physically coupling the replacement tail rotor drive shaft cover to the first exterior surface of the tail boom of the helicopter to cover the tail rotor drive shaft comprises physically coupling at least the first end and a second end of the replacement tail rotor drive shaft cover to the first exterior surface of the tail boom of the helicopter to cover the tail rotor drive shaft, the replacement tail rotor drive shaft cover having the approaching side that includes the first portion that extends curvedly downwards from the vertical apex to the transition point and the second portion that extends vertically downwards from the transition point to the first end, the exiting side that is opposite the approaching side and extends downwards from the vertical apex to the second end in a single continuous curve, and the vertical apex at the intersection between the approaching side and the exiting side.

12. A tail rotor drive shaft cover, comprising:
an approaching side that includes at least a portion that and extends directly in a vertical direction;
an exiting side opposite the approaching side; and
a vertical apex at an intersection between the approaching side and the exiting side;
wherein the approaching side, the exiting side, and the vertical apex collectively form at least a portion of a first exterior surface of the tail rotor drive shaft cover that causes acceleration of air flow along the exiting side and does not cause acceleration of air flow along the approaching side, the first exterior surface asymmetrical with respect to a vertical plane that passes through the vertical apex; and
wherein the tail rotor drive shaft cover is physically coupleable to a second exterior surface of a helicopter tail boom.

13. The tail rotor drive shaft cover of claim 12 wherein the exiting side extends curvedly downwards from the vertical apex.

14. The tail rotor drive shaft cover of claim 12 wherein the exiting side extends curvedly downwards from the vertical apex.

15. The tail rotor drive shaft cover of claim 12 wherein the exiting side extends downwards from the vertical apex to form a single continuous curve from the vertical apex to a first end of the tail rotor drive shaft cover.

16. The tail rotor drive shaft cover of claim 12 wherein the approaching side comprises:
a first portion that extends curvedly downwards from the vertical apex to a transition point; and
a second portion that extends vertically downwards from the transition point and forms a first end of the tail rotor drive shaft cover.

17. The tail rotor drive shaft cover of claim 16 wherein the first portion and the second portion of the approaching side of the tail rotor drive shaft cover form a shelf.

18. The tail rotor drive shaft cover of claim 16, further comprising:
a hinge located at the transition point.

19. The tail rotor drive shaft cover of claim 16, further comprising:
a strake located at the transition point.

20. The tail rotor drive shaft cover of claim 12 wherein at least a portion of the approaching side and the exiting side are integral and continuous at the intersection at the vertical apex.

21. The tail rotor drive shaft cover of claim 12 wherein the approaching side, the exiting side, and the vertical apex collectively form a cambered housing that has the first exterior surface.

22. The tail rotor drive shaft cover of claim 21 wherein the cambered housing has an interior space that is opposite the first exterior surface and sized to house a tail rotor drive shaft mounted exterior to the helicopter tail boom.

23. The tail rotor drive shaft cover of claim 21 wherein a bottom of the cambered housing is open to receive the tail rotor drive shaft.

24. The tail rotor drive shaft cover of claim 16 wherein the exiting side extends downwards from the vertical apex in a single continuous curve and forms a second end of the tail rotor drive shaft cover.

25. The tail rotor drive shaft cover of claim 24 wherein the first end is at a first vertical height that is a first vertical distance from the vertical apex, the second end is at a second vertical height that is a second vertical distance from the vertical apex, and the second vertical distance is greater than the first vertical distance.

26. The tail rotor drive shaft cover of claim 24 wherein the first end is at a first horizontal distance from the vertical apex, the second end is at a second horizontal distance from the vertical apex, and the second horizontal distance is greater than the first horizontal distance.

27. The tail rotor drive shaft cover of claim 24 wherein the first end and the second end are respectively physically coupleable to different portions of the second exterior surface of the helicopter tail boom.

28. A helicopter, comprising:
a tail boom that has a first exterior surface;
a tail rotor drive shaft mounted exterior to the tail boom; and
a tail rotor drive shaft cover physically coupled to the first exterior surface of the tail boom to cover the tail rotor drive shaft, the tail rotor drive shaft cover comprising:
an approaching side;
an exiting side opposite the approaching side; and
a vertical apex at an intersection between the approaching side and the exiting side;

wherein the approaching side, the exiting side, and the vertical apex of the tail rotor drive shaft cover collectively form at least a portion of a second exterior surface of the tail rotor drive shaft cover that causes acceleration of air flow along the exiting side and does not cause acceleration of air flow along the approaching side, the second exterior surface asymmetrical with respect to a vertical plane that passes through the vertical apex, and wherein the approaching side of the tail rotor drive shaft cover extends from the vertical apex to a point at the first exterior surface of the tail boom located at or above a vertical center of the tail boom.

29. The helicopter of claim 28 the tail rotor drive shaft cover and the tail boom form a cavity therebetween to house the tail rotor drive shaft.

30. The helicopter of claim 28 wherein the approaching side includes at least a portion that is not curved, and the exiting side extends curvedly downwards from the vertical apex.

31. The helicopter of claim 28 wherein the approaching side includes at least a portion that is not curved and that extends directly in a vertical direction, and the exiting side extends curvedly downwards from the vertical apex.

32. The helicopter of claim 28 wherein the approaching side includes at least a portion that is not curved, the exiting side has a first end at the vertical apex and a second end that is opposite the first end and physically coupled to the first exterior surface of the tail boom, and the exiting side extends downwards from the vertical apex to form a single, continuous curve from the vertical apex to the second end.

33. The helicopter of claim 28 wherein the vertical apex is located directly vertically above the tail rotor drive shaft.

34. The helicopter of claim 28 wherein the approaching side comprises:
a first portion that extends curvedly downwards from the vertical apex to a transition point that is located above a vertical center of the tail boom; and
a second portion that extends vertically downwards from the transition point and forms a first end of the tail rotor drive shaft cover that is physically coupled to the first exterior surface of the tail boom at the point located at or above the vertical center of the tail boom and horizontally between a center of the tail boom and a first horizontal apex of the tail boom.

35. The helicopter of claim 34 wherein the first portion and the second portion of the approaching side of the tail rotor drive shaft cover form a shelf.

36. The helicopter of claim 34, further comprising:
a hinge located at the transition point.

37. The helicopter of claim 34, further comprising:
a strake located at the transition point.

38. The helicopter of claim 37, further comprising:
a second strake located on the first exterior surface of the tail boom at a point vertically directly below the transition point.

39. The helicopter of claim 34 wherein the exiting side extends downwards from the vertical apex in a single, continuous curve and forms a second end of the tail rotor drive shaft cover that is physically coupled to the first exterior surface of the tail boom at a second horizontal apex of the tail boom that is opposite the first horizontal apex.

40. The helicopter of claim 39 wherein the first end is at a first vertical height that is a first vertical distance from the vertical apex, the second end is at a second vertical height that is a second vertical distance from the vertical apex, and the second vertical distance is greater than the first vertical distance.

41. The helicopter of claim 39 wherein the first end is at a first horizontal distance from the vertical apex, the second end is at a second horizontal distance from the vertical apex, and the second horizontal distance is greater than the first horizontal distance.

* * * * *